United States Patent [19]

Vinci

[11] Patent Number: 5,046,453

[45] Date of Patent: Sep. 10, 1991

[54] ANIMAL TRAINING APPARATUS

[76] Inventor: René Vinci, 4 rue Raymond Bistors, F 66028 Perpignan, France

[21] Appl. No.: 378,901

[22] Filed: Jul. 12, 1989

[51] Int. Cl.$^5$ ............................................. A01K 15/02
[52] U.S. Cl. ..................................... 119/29; 119/159; 239/132; 239/152
[58] Field of Search ................. 119/29, 106, 159, 112, 119/158; 239/36, 152, 153, 154, 132

[56] References Cited

U.S. PATENT DOCUMENTS

| | | | |
|---|---|---|---|
| 3,072,097 | 1/1963 | Morchand | 119/109 X |
| 3,339,806 | 9/1967 | Reich et al. | 239/132 X |
| 3,823,691 | 7/1974 | Morgan | 119/29 |
| 4,162,764 | 7/1979 | Millsap | 239/152 |
| 4,180,013 | 12/1979 | Smith | 119/29 |
| 4,185,581 | 1/1980 | Tilton | 119/159 X |
| 4,202,293 | 5/1980 | Gonda et al. | 119/29 |
| 4,632,385 | 12/1986 | Vinci | 239/152 X |

Primary Examiner—Robert P. Swiatek
Assistant Examiner—Todd E. Manahan
Attorney, Agent, or Firm—Weintraub, DuRoss & Brady

[57] ABSTRACT

The animal training apparatus can be used either to discourage a dog from barking, or in the training of animals. The apparatus is preferably affixed to the collar of the animal and emits a cold fluid onto the skin of the animal. In the dog-barking embodiment, the apparatus includes a sensor to detect the barking, an electrical signal being generated which results in the application of the cold fluid onto the apparatus includes a receiver which receives signals from a remote source (an animal trainer), and the cold fluid is applied to the animal at the initiation of the animal trainer.

13 Claims, 4 Drawing Sheets

ANIMAL TRAINING APPARATUS

FIELD OF THE INVENTION

The present invention is relative to an apparatus to change the behavior of an animal.

BACKGROUND OF THE INVENTION

Numerous pets live in residential neighborhoods and apartments. This cohabitation with people poses a serious problem involving the animal's prolonged antisocial behavior, such as dog barking. Prolonged barking may constitute a significant nuisance, and eventually result in serious litigation.

Several devices are known to discourage a dog from barking which are sometimes cruel. One such apparatus emits sounds annoying to the dog whenever a barking-type sound is detected. Another device electrically shocks the dog whenever a barking-type sound is detected.

SUMMARY OF THE INVENTION

The objective of the apparatus of the present invention is to effectively and more gently modify the behavior of an animal.

An apparatus according to the invention, is incorporated into an animal collar. The preferred embodiment of the apparatus comprises a sound receiver, capable of emitting an electrical signal whenever the barking of the dog is detected. The apparatus is comprised of means for detecting the barking of the dog, the detecting means activating an electrical signal. The electrical signal, activates a means for lowering the temperature of a fluid, the cold fluid being released onto the skin of the dog, encouraging the dog to stop barking. The elements in contact with the skin of the dog deposit the cooled fluid thereon by an ejection tube incorporated into the collar of the dog. Alternatively, several tubes may be used rather than a single tube. The fluid is preferably contained in a reservoir under pressure incorporated in the collar. The fluid is a volatile liquid contained in the reservoir in an equilibrium liquid vapor state, the pressure of the fluid determining the pressure in the reservoir.

According to another embodiment of the invention, the means enabling the lowering of the temperature of the fluid include an electrically-actuated valve, and a flow regulator fitted at the end of the tube to regulate liquid flow therethrough. The enabling means is incorporated into the collar of the dog. When the presence of the electrical signal activates the electrically-activated valve, the reservoir containing the fluid and the flow regulator are, in turn, activated. The fluid escapes from the reservoir by the flow regulator and the tube. The release and vaporization of the fluid lower the fluid temperature within the tubular member.

According to yet another embodiment of the invention, the release of the fluid through the flow regulator and the tubular member generate a noise audible by the dog. The flow of the cold fluid onto the skin of the dog constitutes a sensation perceived by the dog.

According to still another embodiment of the invention, the apparatus includes an electronic circuit and an electric-supply line electrical power source combined with power regulation means. Preferably, the electronic circuit includes:

a microphone which receives the exterior noises (the barking of the dog);

a means for adjusting the sensitivity of the microphone;

a narrow band amplifier amplifying only the frequencies corresponding to the barks;

a relay;

and the coil of the electrically-activated valve.

According to but another embodiment of the invention, the relay is activated by a radio receiver incorporated into the collar. When the radio receiver is excited by a radio emitter activated by an animal trainer, the cold fluid is deposited directly onto the skin of the animal.

For a more complete understanding of the animal training apparatus of the present invention, reference is made to the following detailed description and accompanying drawings in which presently preferred embodiments of the invention are shown by way of example. As the invention may be embodied in several forms without departing from the spirit or essential characteristics thereof, it is expressly understood that the drawings are for purposes of illustration and description only and are not intended as a definition of the limits of the invention.

BRIEF DESCRIPTION OF THE DRAWINGS

The drawings given by way of non-restrictive examples, enable one to better understand the embodiments of the present invention.

DETAILED DESCRIPTION OF THE PREFERRED EMBODIMENTS

Figure 1:
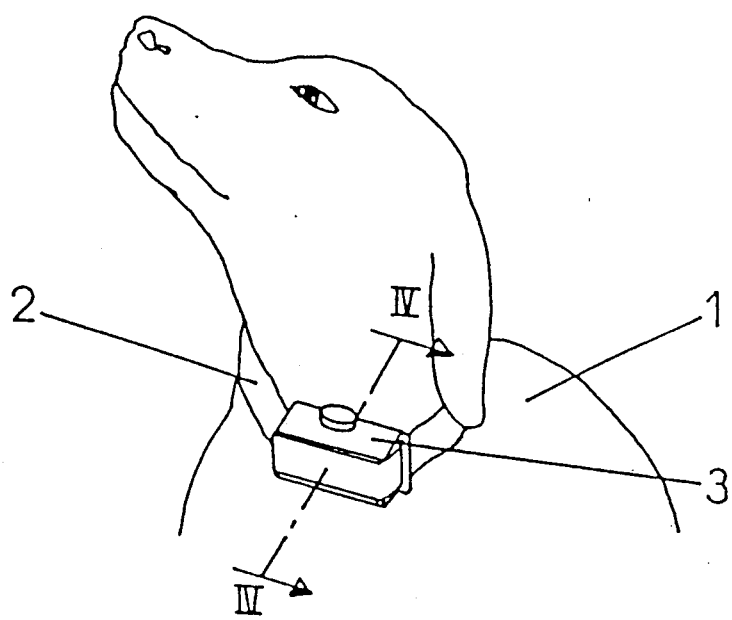
FIG. 1 is the preferred embodiment of the apparatus of the present invention worn around the collar of a dog.
Figure 2:
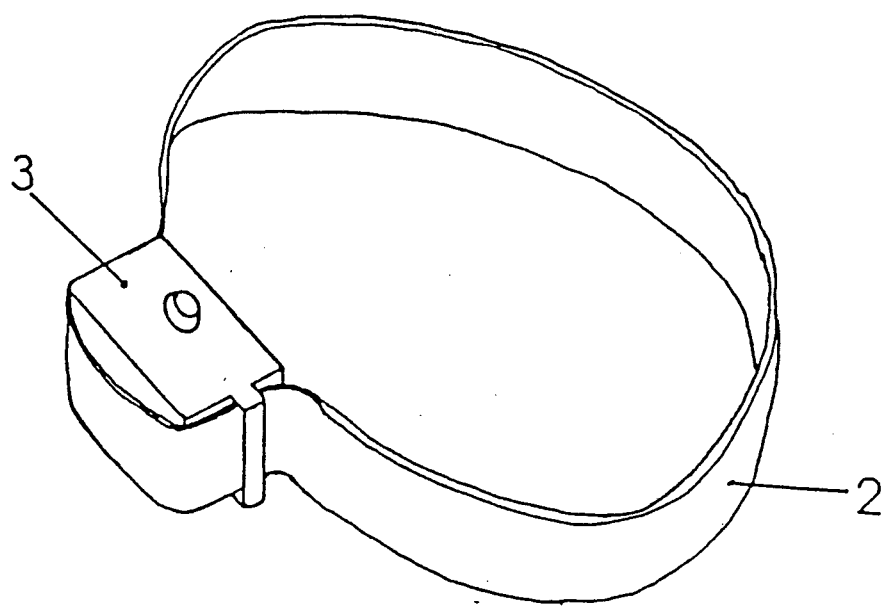
FIG. 2 depicts the apparatus of FIG. 1 in the form of a miniaturized box.
Figure 3:
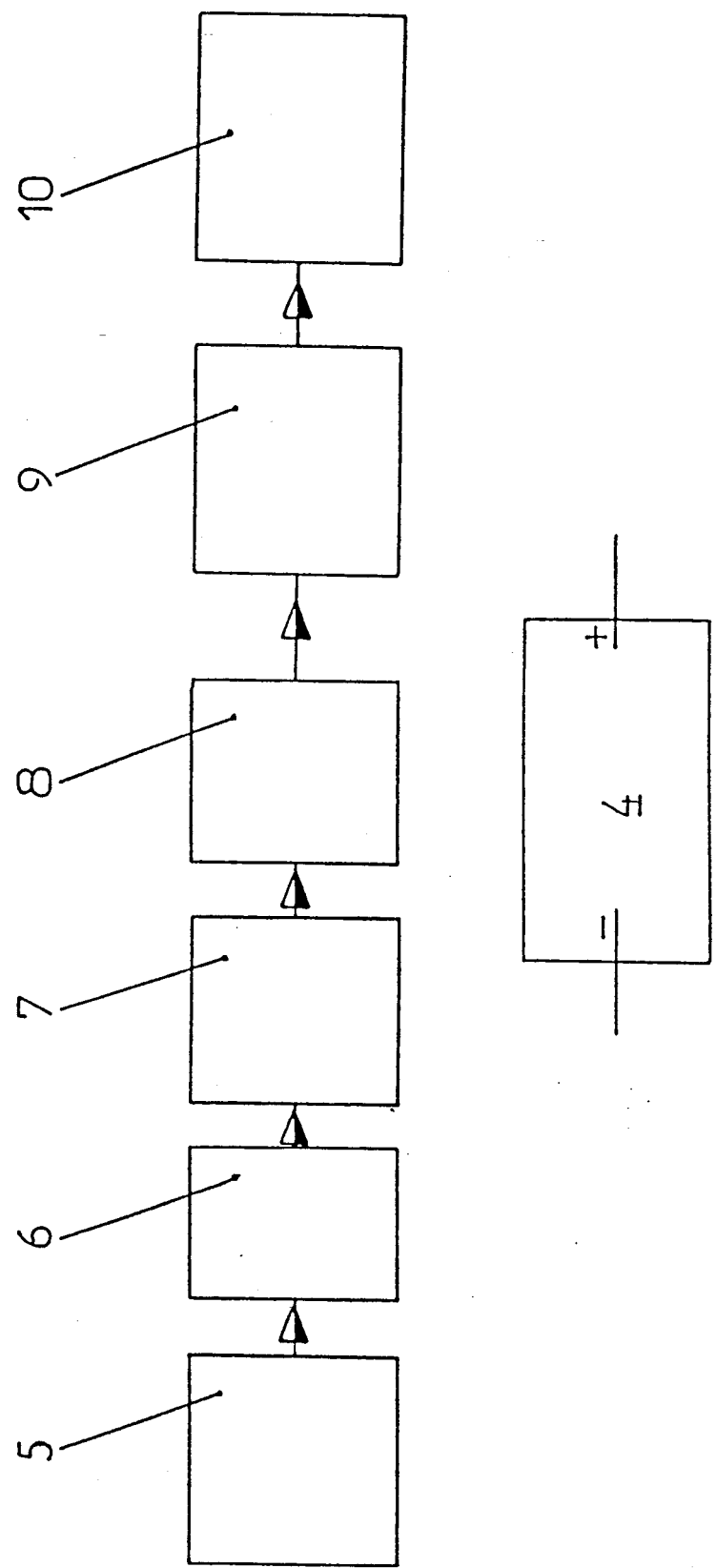
FIG. 3 is a block diagram illustrating the electronic wiring of the device, according to the invention.
Figure 4:
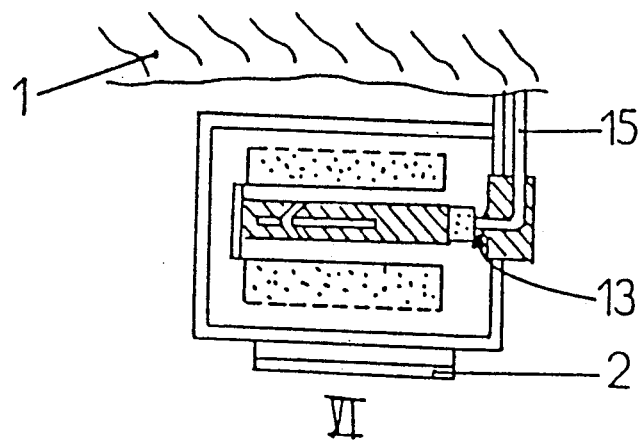
FIG. 4 is a sectional view of Section of IV—IV of FIG. 1, depicting the contents of the box.
Figure 7:
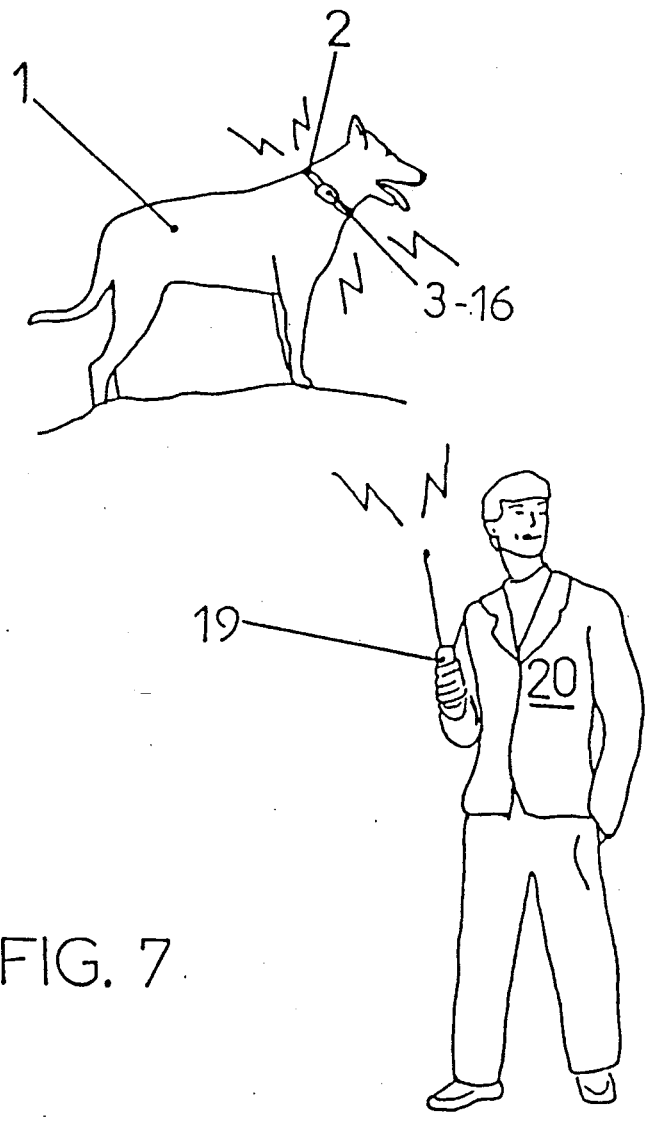
FIG. 7 shows how the apparatus may be used for the training of an animal.

Referring now the drawings, FIGS. 1 and 7 depict a dog 1 wearing a collar 2 according to the preferred embodiment of the present invention. The collar 2 houses the apparatus 3 including the electrical components.

An electric-supply line 4, includes an electrical power source combined with a power regulator, and is mounted on a microphone 5. The microphone 5 detects the barking of the dog 1 and generates an electrical signal. The electrical signal crosses a filter 6 which filters out noises other than the barking sound. An amplifier 7 generates an electrical signal only if the noise received by the microphone 5 is of sufficient intensity, the noise threshold of the amplifier 7 controlling a relay 8. The closed relay 8 enables a signal of predetermined duration, the time duration being adjustable. The closed relay 8 enables a powerful circuit 9 to be energized, the circuit 9 being capable of transmitting into the coil 10 and an electrically-actuated valve, a current sufficient to activate the magnetic core of the electrically-actuated valve 11 during the time that the relay 8 is closed. The pressurized fluid 14, which is stored in a reservoir 12 is then placed in contact with a flow regulator 13. The pressurized fluid contained in the reservoir 12 is metered by the flow regulator 13 and escapes by a tubular member 15, the fluid being all or partially vaporized, creating a cooling effect. The fluid, which comes into direct contact with the skin of the dog, continues to vaporize. The tubular member 15 is also cooled and, disposed at the collar on the skin of the dog 1, contributes to the cold sensation. In one embodiment, the fluid 14 may be compressed air.

If the fluid is too irritating to the skin of the dog, the projection onto the skin can be avoided by directing the cold fluid through the tubular member 15 away from the dog. The cooling sensation is then caused solely by the contact of the tubular member 15 with the skin of the dog 1.

The relay 8 may be controlled by a radio receiver 16 equipped with an antenna receiving the signals produced by a radio transmitter 19 (see FIG. 7).

The noise of the ejection of the cold fluid 14, combined with the functional noise of the mechanical action of the jet onto the skin, tends to discourage the dog from barking. Alternatively, one can utilize only the sensation of the cold or the noise of the mechanical action. The reservoir 12 may be a carboy that can be dismantled and affixed to the apparatus 3 or a fixed, integrated reservoir including a filling valve 18.

Figure 5:
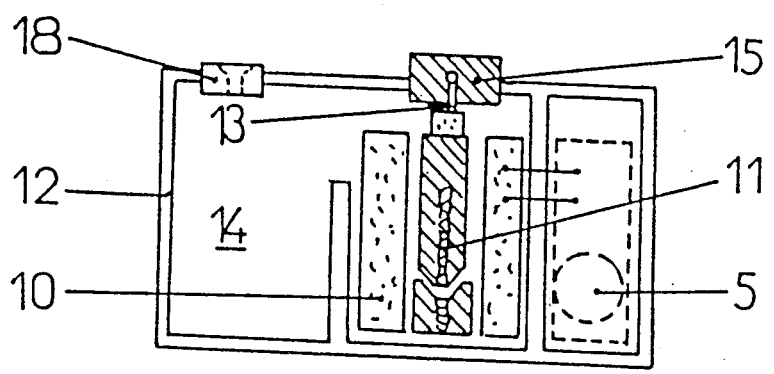
FIG. 5 is a sectional view along Section V—V of FIG. 6.
Figure 6:
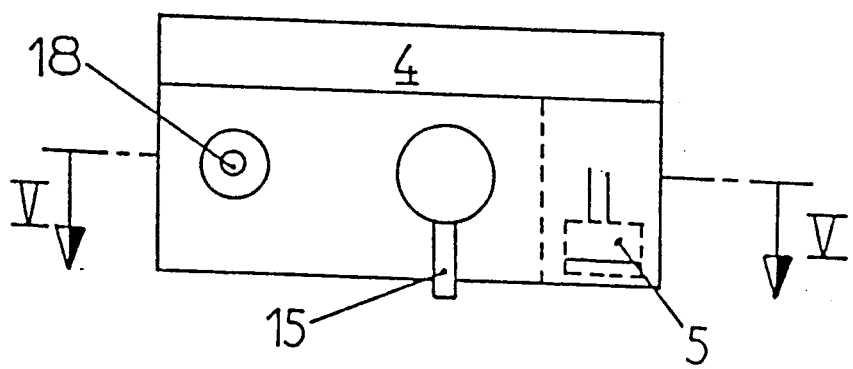
FIG. 6 is an external view of the box of FIG. 2.

Referring now to FIG. 5, the electrically-actuated valve 11 comprises an electromagnetic coil 10 of a fixed core, a magnetic circuit, a spring and a mobile coil, equipped at the tip with a supply plug closing the flow regulator 13 by the action of the spring and from the pressure in the reservoir 12.

The apparatus 10 of the present invention operates in the following manner. The dog 1 wears the collar 2, equipped with the box 3. The release of the electrically-actuated valve 11 provokes the ejection of the fluid by the tubular member 15, the compressed fluid 14 being contained in the reservoir 12 is partially vaporized and cold. The cold fluid thereby ejected is deposited onto the skin of the dog, and continues to vaporize thereon, provoking the sensation of cold and the flow of a fluid onto the skin. The fluid may be directed by the tubular member 15 elsewhere than on the skin of the dog 1. The tubular member 15 is cooled inducing the sensation of cold, and a noise is produced which is audible by the dog 1, of turbulent flow of the cold fluid 14. If the microphone 5 and the amplifier 7 are adjusted to take into account only the barking sound of dog 1, the emission of the fluid 14 will occur with each bark.

If the apparatus comprises a radio receiver 16 which controls the relay 8, the emission of the cold fluid 14 occurs each time that the radio transmitter 19 is activated by the trainer 20. Of course, one does not exceed the scope of the invention by replacing the electrically-activated valve 11 and its coil 10 with a pinching electrically-activated valve capable of assuring the same function.

The box according to the invention may be affixed anywhere onto the body of the animal by any means. In particular, the collar may be realized in the form of a strap, or a harness, or the like. In the example illustrated in FIGS. 1 and 7, the box is affixed at the neck of the animal. This position may be realized at other locations on the body of the animal, notably as a function of its reactions, or as a function of training. This is clearly an important characteristic of the invention.

While the animal training apparatus of the present invention has been described in conjunction with specific embodiments, many alternatives, modifications, and variations may be made to these embodiments in light of the disclosure herein. It is intended that the metes and bounds of the invention be determined by the appended claims rather than by the language of the above specification, and that all such alternatives, modifications, and variations which form a functions or conjointly cooperative equivalent are intended to be included within the spirit and scope of these claims.

I claim:

1. An apparatus for controlling the behavior of a dog, the apparatus being disposed near the skin of a dog to release a fluid contained within the apparatus upon the skin of the dog, the dog having a body and the dog wearing a collar, the apparatus comprising:
   (a) means for detecting a barking sound of the dog, the detecting means generating a signal in response to the barking of the dog;
   (b) means for supplying a stream of fluid, in response to the signal; and
   (c) tubular member in contact with the means for supplying a stream of fluid, the tubular member being in contact with the skin of the dog, the tubular member directing the fluid onto the dog; and
   wherein the means for supplying the fluid is effective to rapidly lower the temperature of the tubular member, thereby applying a cooling sensation onto the skin of the dog.

2. The apparatus of claim 1, further comprising:
   (d) means for reducing the temperature of the fluid below ambient temperature, the reducing temperature means being activated by the signal in response to the barking of the dog, the reduced temperature fluid being subsequently applied to the skin of the barking dog.

3. The apparatus of claim 2, further comprising a reservoir, the fluid being initially stored under pressure in the reservoir in a partial vapor state and a partial liquid state, the liquid state being in equilibrium with the vapor state, the reservoir being disposed within the collar.

4. The apparatus of claim 3, wherein the means for reducing the temperature of the fluid includes an electrically activated valve and a flow regulator, the electrically activated valve being in fluid communication with the reservoir and the flow regulator, the electrically activated valve initiating the release of the fluid from the reservoir, and the electrically activated valve initiating the flow of the fluid through the flow regulator.

5. The apparatus of claim 4, wherein the electrically activated valve initiates vaporization and temperature reduction of the fluid flowing through the flow regulator, the fluid at the reduced temperature being directed through the tubular member, the fluid at the reduced temperature vaporizing onto the skin of the dog further enhancing a cooling sensation to the dog.

6. The apparatus of claim 1, wherein the means for applying the fluid onto the skin of the dog makes a noise that is audible to the dog while the fluid is being directed through the tubular member.

7. The apparatus of claim 1, wherein the detecting means includes a microphone which receives the barking sound of the dog, the microphone having a sensitivity which is adjustable.

8. The apparatus of claim 1, wherein the detecting means includes a narrow band amplifier, the narrow band amplifier being adjustable to amplify only frequencies corresponding to the barking sound of the dog.

9. The apparatus of claim 1, wherein the fluid is compressed air.

10. An apparatus for the training of animals, the apparatus being disposed near the skin of the animal, the apparatus comprising:
   (a) means for receiving a message from a trainer, the receiving means generating a signal in response to the message from the trainer;
   (b) means for supplying a stream of fluid at a temperature less than ambient temperature in response to the signal to encourage the animal to respond to the message from the trainer;
   (c) a tubular member in contact with the means for supplying a stream of fluid, the tubular member being in contact with the skin of the animal, the tubular member directing the fluid onto the animal; and wherein the means for supplying the fluid is effective to rapidly lower the temperature of the tubular member, thereby applying a cooling sensation onto the skin of the animal.

11. The apparatus of claim 10, wherein the receiving means is a radio receiver, which is excited by a radio transmitter activated by the trainer.

12. The apparatus of claim 10, further comprising:
   (d) means for reducing the temperature of the fluid below the temperature of ambient air in response to the signal, the temperature of the fluid being reduced prior to the deposition of the fluid upon the skin of the animal.

13. The apparatus of claim 10, wherein the fluid is compressed air which is stored under pressure in a reservoir in a partial vapor state and a partial liquid state, the liquid state being in equilibrium with the vapor state, the reservoir being disposed within the collar.

* * * * *